United States Patent
Giefer et al.

(10) Patent No.: US 8,161,837 B2
(45) Date of Patent: Apr. 24, 2012

(54) EMERGENCY UNLOCKING DEVICE FOR A PARKING LOCK

(75) Inventors: Andreas Giefer, Lemforde (DE); Ludger Rake, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 12/812,605

(22) PCT Filed: Dec. 5, 2008

(86) PCT No.: PCT/DE2008/050039
§ 371 (c)(1),
(2), (4) Date: Jul. 13, 2010

(87) PCT Pub. No.: WO2009/094969
PCT Pub. Date: Aug. 6, 2009

(65) Prior Publication Data
US 2010/0288598 A1 Nov. 18, 2010

(30) Foreign Application Priority Data
Jan. 28, 2008 (DE) .................. 10 2008 006 398

(51) Int. Cl.
*G05G 5/08* (2006.01)
*G05G 5/00* (2006.01)
*B60W 10/10* (2012.01)

(52) U.S. Cl. ............... 74/473.26; 74/473.21; 192/219.4

(58) Field of Classification Search ............ 74/473.1, 74/473.21, 473.23, 473.24, 473.25, 473.26; 192/219.4, 219.5, 219.6
See application file for complete search history.

(56) References Cited

U.S. PATENT DOCUMENTS

| 2,593,297 | A | * | 4/1952 | Gregoire | 74/473.21 |
| 2,860,731 | A | * | 11/1958 | Hause | 188/69 |
| 2,966,244 | A | * | 12/1960 | Schreyer | 477/197 |
| 3,796,103 | A | * | 3/1974 | Winfield, Jr. | 74/18.2 |
| 3,912,050 | A | * | 10/1975 | Iwanaga et al. | 188/69 |
| 4,727,967 | A | * | 3/1988 | Ogasawara et al. | 192/219.5 |
| 4,926,688 | A | * | 5/1990 | Murasaki | 74/527 |
| 5,063,817 | A | * | 11/1991 | Bogert | 477/125 |
| 5,217,098 | A | * | 6/1993 | Nyezdatny | 192/219.4 |
| 5,704,457 | A | * | 1/1998 | Kimura et al. | 192/220.2 |
| 5,794,748 | A | * | 8/1998 | Heuver et al. | 192/220.2 |
| 5,878,623 | A | * | 3/1999 | Teich | 74/473.3 |
| 6,401,899 | B1 | * | 6/2002 | Kanehisa et al. | 192/219.5 |
| 6,481,556 | B1 | * | 11/2002 | Haupt | 192/219.5 |
| 6,588,294 | B1 | * | 7/2003 | Rogg | 74/473.21 |

(Continued)

FOREIGN PATENT DOCUMENTS
DE 198 37 832 A1 2/2000
(Continued)

*Primary Examiner* — Justin Krause
*Assistant Examiner* — Adam D Rogers
(74) *Attorney, Agent, or Firm* — Davis & Bujold, P.L.L.C.

(57) ABSTRACT

An emergency release device for manual actuation of the parking lock of a shift-by-wire transmission. The emergency release device comprises a mechanical transfer device located between an emergency release actuator and the transmission and engages a pivoting lever mechanism arranged on a transmission shifting shaft. A characterizing feature of the emergency release device is that the pivoting lever mechanism comprises a primary pivoting lever connected to the transfer device, a secondary pivoting lever connected to the transmission and a unidirectional coupling element located between the primary and the secondary pivoting levers. The advantage of this device relates to reduced susceptibility to corrosion, wear and noise emission and easier correct adjustment of the transfer device during assembly, while a separate prestressing mechanism for the cable of the emergency parking lock release can be omitted.

13 Claims, 3 Drawing Sheets

U.S. PATENT DOCUMENTS

| | | | |
|---|---|---|---|
| 6,631,654 B2 * | 10/2003 | Ehrmaier et al. | 74/473.15 |
| 6,872,165 B2 * | 3/2005 | Gierer | 477/92 |
| 7,677,128 B2 * | 3/2010 | Shimizu et al. | 74/473.23 |
| 2003/0019713 A1 * | 1/2003 | Gudlin | 192/219.4 |
| 2005/0044979 A1 * | 3/2005 | Fort et al. | 74/473.21 |
| 2007/0144295 A1 * | 6/2007 | Otashiro | 74/473.21 |
| 2008/0098845 A1 * | 5/2008 | Meyer | 74/473.26 |

FOREIGN PATENT DOCUMENTS

| | | |
|---|---|---|
| DE | 10 2005 024 468 A1 | 12/2006 |
| DE | 102005024468 A1 * | 12/2006 |
| EP | 1 111 275 A2 | 6/2001 |

* cited by examiner

EMERGENCY UNLOCKING DEVICE FOR A PARKING LOCK

This application is a National Stage completion of PCT/DE2008/050039 filed Dec. 5, 2008, which claims priority from German patent application serial no. 10 2008 006 398.3 filed Jan. 28, 2008.

FIELD OF THE INVENTION

The invention concerns an emergency release device for the manual actuation of the parking lock of a gear-change transmission, for example an automatic shift-by-wire transmission.

BACKGROUND OF THE INVENTION

Parking locks are always used when non-mechanical components are involved in the transmission of the driving force in motor vehicles, especially in automatic transmissions with a hydrodynamic torque converter. In this way, despite the non-mechanical connection between the drivetrain and the motor of the motor vehicle, the drive wheels can be locked and unintentional rolling away of the vehicle can be prevented. For this purpose, as a result of an actuation signal issued by the driver, the parking lock blocks the transmission output shaft connected in a rotationally fixed manner to the drive wheels, at least in that a locking pawl arranged in the automatic transmission is brought into engagement with the teeth of a parking lock gearwheel fixed on the transmission output shaft.

As the transfer device, between the parking lock and the actuating device located in the passenger compartment of the motor vehicle for the vehicle's transmission, in principle various mechanical, electro-hydraulic and electro-mechanical systems are known. To improve the design options as regards the free arrangement of the actuating device in the passenger compartment, and also to ensure acoustical decoupling of the actuating device from the drivetrain of the motor vehicle, in modern motor vehicles or automatic transmissions the shift-by-wire principle is adopted more and more often, particularly also because modern automatic transmissions are more and more often controlled completely by electronic means.

In such "shift-by-wire" transmissions the shifting commands are as a rule transmitted from the actuating device or selector lever of the automatic transmission exclusively by means of electric or electronic signals. With regard to the parking lock, this means that actuation of the parking lock as well takes place by electric or electronic means, sometimes even automatically, for example in the case of an Auto-P function, namely when the parking lock is engaged automatically when the ignition key is withdrawn or the motor vehicle is left.

This, however, entails the additional requirement that in the event of failure of the electronic system or failure of the motor vehicle's electrical voltage supply, it must be possible to disengage the parking lock again by means of an emergency release system, in order to be able to move the vehicle even in such eventualities. For example, this is necessary when the vehicle is in a workshop or if it has to be towed in the event of a breakdown.

For this purpose shift-by-wire actuating devices for automatic transmissions are known, in which an additional mechanical connection for emergency use is provided between the selector lever—or between an independent emergency release actuator and the transmission, for example a cable. In this way, even if the electrical system has failed completely, the parking lock—after appropriate actuation of the emergency release system—can be released (and closed again) mechanically by means of the cable, so that the vehicle can in any case be moved.

Such mechanical connections or cables for emergency actuation of the parking lock in the transmission are usually connected by a pivoting lever to a shifting shaft of the transmission, so that if there is a failure of the voltage supply or of the transmission control system the shifting shaft, normally only moved by the transmission hydraulics, can also be moved for emergency operation purposes by the cable and pivoting lever and the parking lock can thereby be deactivated manually.

In normal operation, however, the problem then arises that the shifting shaft in the transmission and the emergency release pivoting lever connected thereto are in each case moved at the same time by the transmission hydraulics during shifting operations of the automatic transmission, whereby the mechanical emergency release transfer device between the transmission and the emergency release actuator—for example the cable—would also be moved. But this is undesirable, since it results in annoying noise in the emergency release transfer device and can also lead to unnecessary wear of the transfer device.

From European Patent EP 1 111 275 A1 a driving gear selector device with emergency release for releasing the parking lock is known, in which the cable used for emergency release is only loosely connected to the pivoting lever of the transmission shifting shaft by means of an abutment nipple arranged on the cable, but can otherwise slide freely along a slot-shaped recess of the pivoting lever.

In this way, in case of emergency, force transmission only takes place from the cable to the pivoting lever, but not conversely from the pivoting lever to the cable when the pivoting lever is moved by the transmission hydraulics during normal operation of the motor vehicle.

However, this technical principle known from the prior art is first of all potentially susceptible to corrosion in the area of the open, loose connection between the end of the cable and the pivoting lever. Moreover, precisely because of the loose end of the cable undesired noise can again be produced, which can then be conducted via the cable itself into the vehicle's interior. Furthermore this known technical principle requires an additional spring device on the cable to keep it tight while the transmission hydraulics moves the pivoting lever back and forth. This additional spring device adds to the cost and must also again be protected against corrosion and dirt. Owing to the only loose connection between the cable end and the pivoting lever, this known emergency release system is also prone to maladjustments during assembly, for example if during assembly the free standing length of the cable is measured wrongly.

SUMMARY OF THE INVENTION

Against this background the purpose of the present invention is to provide an emergency release device for manually actuating the parking lock of a shift-by-wire gear-change transmission, which overcomes the aforesaid disadvantages of the prior art. The emergency release device should in particular be reliable and inexpensive, and should have advantages particularly in relation to lower noise emission, improved corrosion protection, and in relation to easier and less error-prone assembly and adjustment of the transfer means.

In a manner accepted per se and known from the start, the parking lock emergency release device according to the present invention for a shift-by-wire gear-change transmission comprises a mechanical transfer device between an emergency release actuator and a transmission for the purpose of releasing the parking lock in emergency. The transfer device engages with a pivoting lever mechanism arranged on a shifting shaft of the transmission.

According to the invention, however, the distinguishing feature of the emergency release device is that the pivoting lever mechanism comprises a primary pivoting lever, a secondary pivoting lever and a unidirectional coupling element between the primary and secondary pivoting levers, which acts in the actuation direction of the emergency release.

The primary pivoting lever is connected to the mechanical transfer device between the emergency release actuator and the transmission, whereas the secondary pivoting lever is connected to the shifting shaft or to the actuating element for the parking lock of the transmission. The unidirectional coupling element couples the primary and secondary pivoting levers to one another when the primary pivoting lever is actuated in relation to the lever pivoting movement. In contrast, when only the secondary pivoting lever moves, the primary and secondary pivoting levers are decoupled from one another by automatic opening of the coupling element that takes place in this case. In other words, the unidirectional coupling element acts similarly to a freewheel with play, in such manner that actuation movement of the primary pivoting lever is transmitted directly to the secondary pivoting lever, whereas in contrast any movements of the secondary pivoting lever alone within the actuation range of the primary pivoting lever do not result in deflection of the primary pivoting lever. Thus, the unidirectional coupling element acts only in one direction.

In this way, the secondary pivoting lever—following rotation of the transmission shifting shaft during normal operation of the transmission—can move back and forth within the actuation range of the primary pivoting lever without the primary pivoting lever and the transfer device of the emergency release actuation—i.e. for example the cable for the emergency release of the parking lock—connected thereto being deflected away from their rest position and moved as well. Thus, undesired noise due to unnecessary movement of the transfer device is prevented, and likewise, the transfer device, since it is not moving, is subjected to less wear and corrosion. The defined connection between the transfer device and the primary pivoting lever also facilitates assembly of the emergency release mechanism and errors in the adjustment of the transfer device can be avoided.

However, if an emergency release of the parking lock becomes necessary, the unidirectional coupling element of the pivoting lever mechanism acts in the desired manner to couple the primary and secondary pivoting levers so that the necessary force transmission can take place starting from the mechanical transfer device—i.e. for example the cable—to the primary pivoting lever and from there via the unidirectional coupling element, the secondary pivoting lever and the transmission shifting shaft, to the device for deactivating the parking lock in the transmission.

According to the preferred embodiments of the invention, the unidirectional coupling element is spring-loaded between the primary and secondary pivoting lever, or the primary pivoting lever relative to the secondary pivoting lever or relative to the transmission housing. The result of this is that the mechanical transfer device or cable for emergency release actuation is prestressed as desired with a view to freedom from disturbance and noise reduction, regardless of the momentary position of the transmission shifting shaft and thus the secondary pivoting lever during normal operation of the transmission. Such a prestressing spring for the primary pivoting lever and the cable, however, can also be arranged in the area of the mechanical transfer device or the end of the cable, for example in the form of a compression spring.

In a further, particularly preferred embodiment of the invention, the primary and secondary pivoting levers are mounted coaxially on the transmission housing. The coaxial mounting of the primary and secondary pivoting levers reduces the structural complexity and enables the two pivoting levers to be mounted together in the area of, or directly on the transmission shifting shaft. Preferably, the spring of the unidirectional coupling element is also arranged on the common mounting of the primary and secondary pivoting levers, i.e. for example on the transmission shifting shaft between the primary and secondary pivoting levers.

A further preferred embodiment of the invention provides that the unidirectional coupling element is formed as an abutment arranged on the secondary pivoting lever for the primary pivoting lever or, optionally, an abutment arranged on the primary pivoting lever for the secondary pivoting lever. In this way the unidirectional coupling element between the primary and secondary pivoting levers can be made particularly simply, robustly and inexpensively, preferably as a bent tab extending from the secondary (or the primary) pivoting lever, against which, in the event of emergency release, the primary (or secondary) pivoting lever comes in contact to move the secondary pivoting lever along with the primary pivoting lever.

The invention can be realized regardless of how the mechanical transfer element between the gear-change transmission and the emergency release actuator is designed. According to a preferred embodiment of the invention, however, the transfer element is in the form of a cable. The cable can be laid freely between the transmission and the emergency release actuator and also has advantages in relation to low noise conduction through solid bodies.

BRIEF DESCRIPTION OF THE DRAWINGS

Below, the invention is explained in greater detail with reference to drawings that represent only example embodiments and which show.

DETAILED DESCRIPTION OF THE PREFERRED EMBODIMENTS

Figure 1:
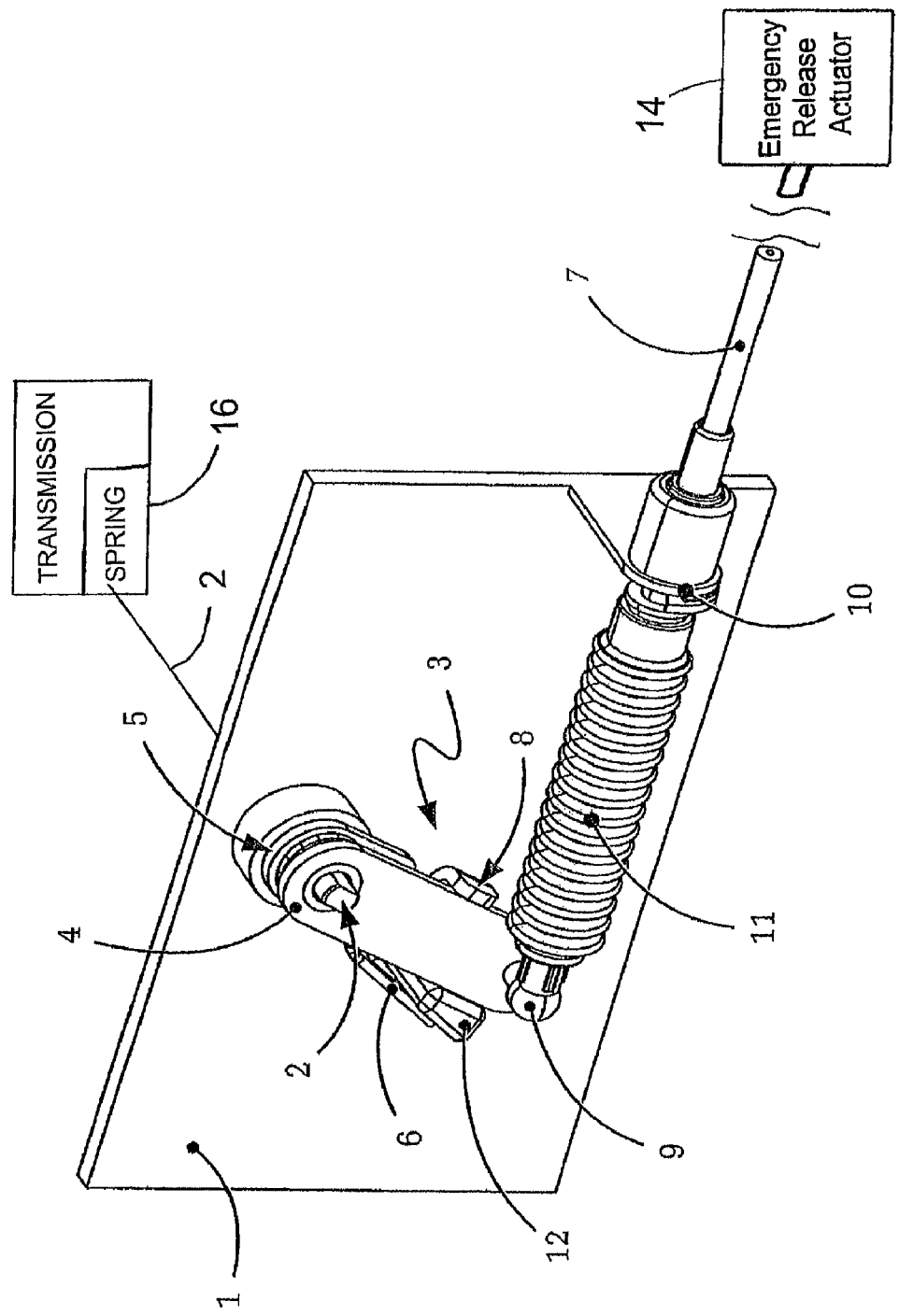
FIG. 1: Schematic isometric view of the pivoting lever mechanism of an embodiment of an emergency release device according to the present invention, with a primary and a secondary pivoting lever in the parking lock position

FIG. 1 shows a schematic, isometric representation of the pivoting lever mechanism of an embodiment of an emergency release device according to the present invention.

The figure shows, first, a section of the wall of the transmission housing 1 and the outward-projecting end of the shifting shaft 2 of the automatic transmission that passes through the transmission housing 1. Also to be seen is the pivoting lever mechanism 3 which, in the embodiment illustrated, consists of the primary pivoting lever 4, the secondary pivoting lever 5 connected in a rotationally fixed manner to the transmission shifting shaft 2, and a lever spring 6 arranged axially between the primary pivoting levers 4 and the secondary pivoting lever 5. In this case the primary pivoting lever 4 is mounted coaxially with the secondary pivoting lever 5 but can rotate, as such, freely relative to the transmission shifting shaft 2 and relative to the secondary pivoting lever 5.

The primary pivoting lever 4 is coupled to an emergency release transfer device comprising a cable or Bowden control cable 7 between the emergency release actuator 14 in the inside space of the motor vehicle and the transmission 1. Besides, the primary pivoting lever 4 and the secondary pivoting lever 5 are coupled to one another by a coupling element 8 which, in the embodiment illustrated, is formed by an angled tab 8 arranged on the secondary pivoting lever 5. Thus—by virtue of the coupling element formed by the angled tab 8—when the primary pivoting lever 4 rotates in a counter-clockwise direction it also swivels the secondary pivoting lever 5 with it, and therefore also the transmission shifting shaft 2 to which the secondary pivoting lever 5 is connected in a rotationally fixed manner.

In contrast, rotation of the secondary pivoting lever 5 counter-clockwise from the position shown in FIG. 1 (and back again) does not result in a concomitant movement of the primary pivoting lever 4 by the transmission shifting shaft 2 and the secondary pivoting lever 5.

In the embodiment illustrated, the cable 7 and the primary pivoting lever 4 are connected to one another by a ball end 9, this ball end 9 being press-fitted onto the end of the traction line of the cable 7. To protect against dirt and surrounding media, the open-running end of the traction line of the cable 7 is protected between the ball end 9 and the cable support bracket 10 by a variable-length elastomeric sealing bellows 11. The fixed connection between the cable 7 and the primary pivoting lever 4 by means of the ball end 9 is also advantageous because by virtue of the defined connection, adjustment effort during the fitting of the cable 7 and assembly errors can be avoided.

Figure 2:
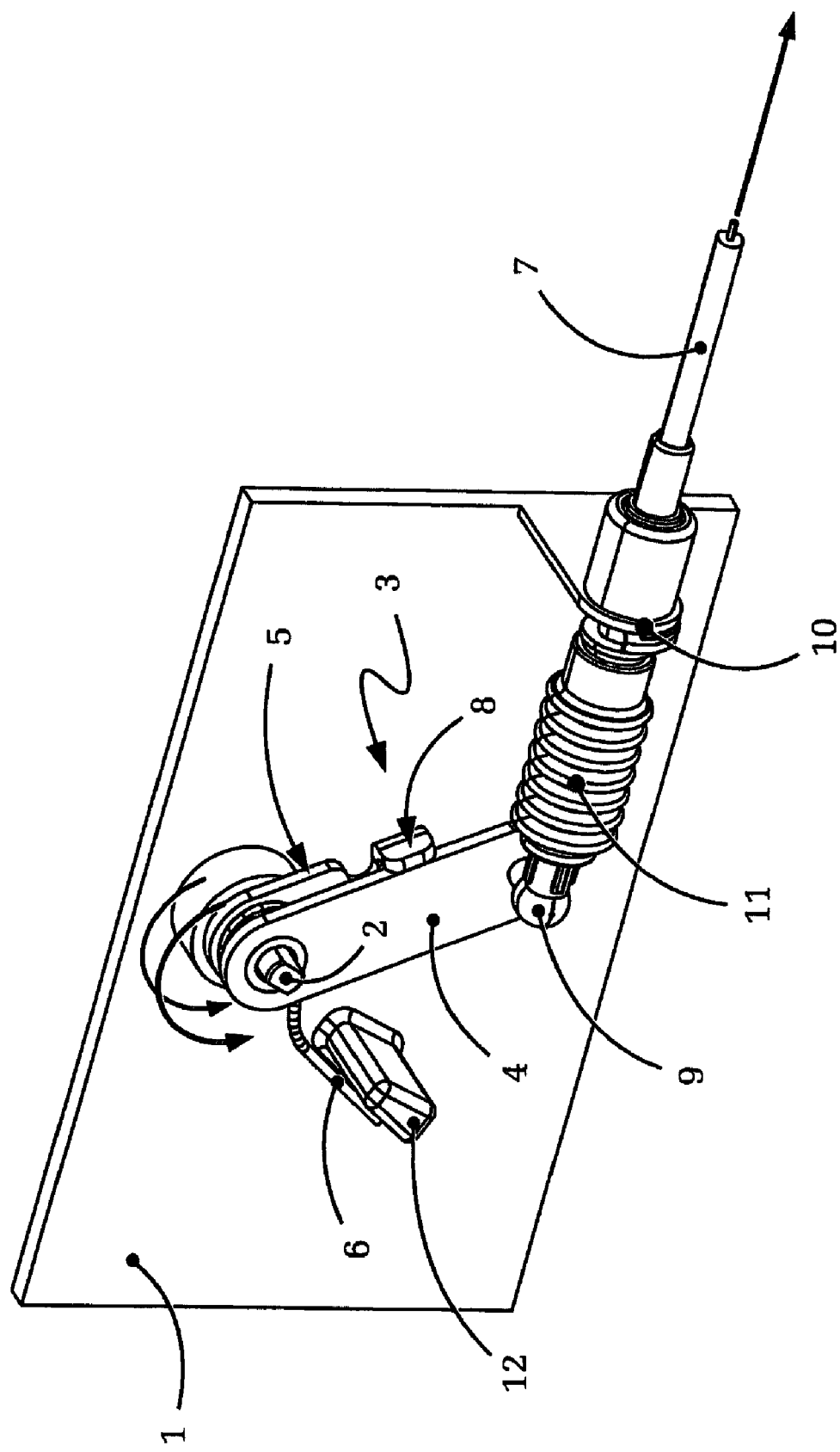
FIG. 2: Representation corresponding to FIG. 1, showing the pivoting lever mechanism according to FIG. 1 when the emergency release is activated.

The carrying along of the secondary pivoting lever 5 by the primary pivoting lever 4 during an emergency release of the parking lock by means of the emergency release actuator via the transfer element 7 is illustrated in FIG. 2. It can be seen how the manual emergency release of the parking lock in the transmission takes place via the active chain "emergency release actuator (not shown), cable 7, ball end 9, primary pivoting lever 4, coupling element 8, secondary pivoting lever 5, transmission shifting shaft 2" for actuating the transmission shifting shaft 2 and thus for the desired manual release of the parking lock in the transmission. If the parking lock is to be reactivated manually, then by correspondingly releasing the emergency release actuator (not shown) the cable is relaxed again. Thereby the primary pivoting lever 4 is swiveled back due to the lever spring 6 into its initial position shown in FIG. 1, while the secondary pivoting lever 5, also falls back to its basic position shown in FIG. 1 due to spring-loading of its own exerted by a spring 16 arranged in the transmission on the shifting shaft 2, whereby the parking lock is again engaged.

Figure 3:
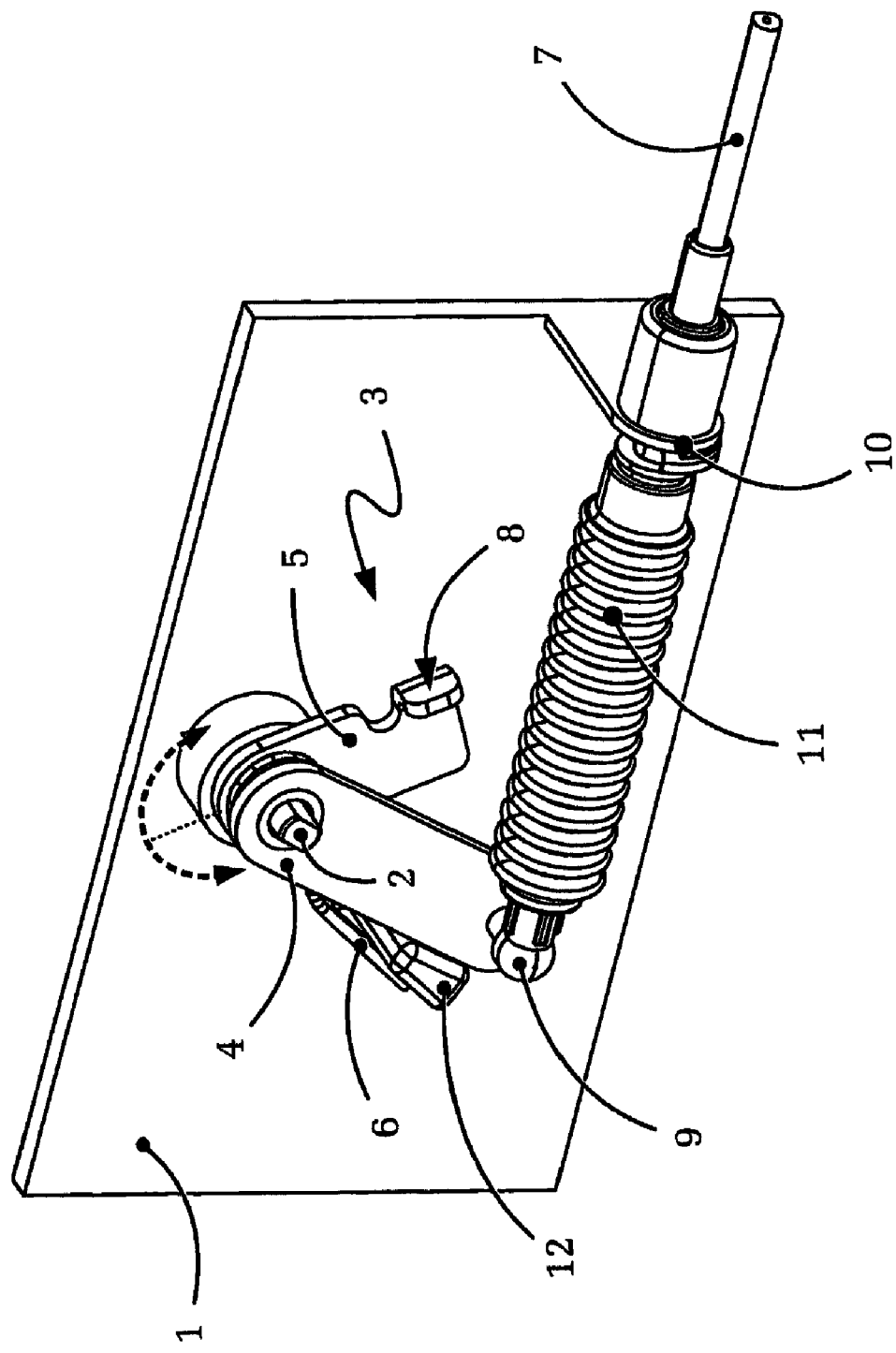
FIG. 3: Representation corresponding to FIGS. 1 and 2, showing the pivoting lever mechanism according to FIGS. 1 and 2 with the secondary pivoting lever in its position when the parking lock is open during normal operation

FIG. 3 illustrates the action of the unidirectional coupling element 8 during normal operation of the transmission—for example while the motor vehicle is being driven. In this case the mechanism for emergency release of the parking lock, with its constituent components the cable 7 and the primary pivoting lever 4, rests against the housing abutment 12 in its rest position—as also shown in FIG. 1—whereas the secondary pivoting lever 5 can follow the autonomous rotations of the transmission shifting shaft 2 that take place during shifting processes of the automatic transmission (indicated by the broken-line arrow), without this having any reactive effect on the emergency release mechanism, in particular on the cable 7.

During this the primary pivoting lever 4 and cable 7 are held by the lever spring 6 in the rest position against the housing abutment 12, whereby at the same time the cable 7 is subjected to the prestress necessary for ensuring its proper function and for suppressing undesired noise.

Thus, as a result it is clear that thanks to the invention, an emergency parking lock release mechanism is provided, which has advantages in particular with regard to reduced susceptibility to corrosion, reduced wear and less noise emission. Moreover, the fitting of the transfer device or cable is facilitated and adjustment errors are avoided. The emergency release mechanism is also robust, potentially long-lasting, and can be realized inexpensively. Separate prestressing means for the cable of the emergency parking lock release, as needed in other systems known from the prior art, can be omitted since this function can be integrated in the pivoting lever mechanism of the emergency release device according to the invention itself.

Thus, the invention contributes toward improving the operating safety, cost-effectiveness, life and ease of assembly of mechanical emergency release devices for parking locks in automatic transmissions.

LIST OF INDEXES

| | |
|---|---|
| 1 | Transmission housing |
| 2 | Shifting shaft |
| 3 | Pivoting lever mechanism |
| 4 | Primary pivoting lever |
| 5 | Secondary pivoting lever |
| 6 | Lever spring |
| 7 | Cable |
| 8 | Coupling element, bent tab |
| 9 | Ball end |
| 10 | Support bracket |
| 11 | Sealing bellows |
| 12 | Housing abutment |

The invention claimed is:

1. An emergency release device for manual actuation of a parking lock of a shift-by-wire gear-change transmission, the transmission being housed within a transmission housing (1), the emergency release device comprising:
   a mechanical transfer device (7) located between an emergency release actuator and the transmission such that the mechanical transfer device (7) engages with a pivoting lever mechanism (3), arranged on a transmission shifting shaft (2) of the transmission,
   the pivoting lever mechanism (3) comprising a primary pivoting lever (4) that is directly connected to the mechanical transfer device (7), a secondary pivoting lever (5) that is rotationally fixed to the transmission shifting shaft (2) and a unidirectional coupling element (8) that is fixed to the secondary pivoting lever (5), the primary pivoting lever (4) and the secondary pivoting (5) being located on an exterior side of the transmission housing;
   the primary pivoting lever (4) and the secondary pivoting lever (5) are coaxially supported on the transmission shifting shaft (2) and the unidirectional coupling element (8) is fixed to and extends axially from the secondary pivoting lever (5) such that the secondary pivoting lever (5) couples the primary pivoting lever (4) via the unidirectional coupling element (8) when the primary pivoting lever (4) is actuated, and the secondary pivoting lever (5) is decoupled from the primary pivoting lever (4) when only the secondary pivoting lever (5) is actuated; and a spring (6) is supported by the transmission shifting shaft (2) axially between the primary and the secondary pivoting levers (4, 5), the spring (6) contacts a housing abutment (12), which is fixed to the transmission housing (1), and communicates with the primary pivoting lever (4) to bias the primary pivoting lever (4) into a rest position abutting the housing abutment (12).

2. The emergency release device according to claim 1, wherein the primary pivoting lever (4) is freely rotatably supported on the transmission shifting shaft (2) and is only biased into an actuated position remote from the housing abutment (12) by the mechanical transfer device (7).

3. The emergency release device according to claim 1, wherein the primary pivoting lever (4) is biased by the spring (6) with regard to one of the secondary pivoting lever (5) and the transmission housing (1).

4. The emergency release device according to claim 1, wherein the mechanical transfer device (7) is a cable.

5. An emergency release device for manual actuation of parking lock of a shift-by-wire gear-change transmission, the transmission being housed within an interior of a transmission housing (1), the emergency release device comprising:

a primary pivoting lever (4) being pivotably supported by a transmission shifting shaft (2) that passes through and extends out from the interior of the transmission housing (1), the primary pivoting lever (4) being pivotable with respect to the transmission shifting shaft (2) about a rotational axis of the transmission shifting shaft (2);

a secondary pivoting lever (5) being fixed to the transmission shifting shaft (2) in a nonrotatable manner such that the secondary pivoting lever (5) and the transmission shifting shaft (2) always rotate in unison;

the primary pivoting lever (4) and secondary pivoting lever (5) being located on an exterior side of the transmission housing (1) opposite the transmission;

a mechanical transfer device (7) being coupled to an end of the primary pivoting lever (4) remote from the transmission shifting shaft (2), and the mechanical transfer device (7) pivotally biasing the primary pivoting lever (4) when actuated;

a unidirectional coupling element (8) being fixed to the secondary pivoting lever (5) and engagable with the primary pivoting lever (4), such that, with regard to the primary and the secondary pivoting levers (4, 5), when the primary pivoting lever (4) is pivotally biased in a first direction, the primary and the secondary pivoting levers (4, 5) being pivoted together in the first direction, and when the secondary pivoting lever (5) is pivotally biased in the first direction by rotation of the transmission shifting shaft (2), the primary and the secondary pivoting levers (4, 5) decouple and only the secondary pivoting lever (5) pivots; and a spring (6) which couples the primary lever (4) and a housing abutment (12), which is integrally fixed to the transmission housing (1), the primary lever (4) being biased into abutment with spring (6) being supported axially between the primary pivoting lever (4) and the secondary pivoting lever (5).

6. The emergency release device according to claim 5, wherein the primary pivoting lever (4) and the secondary pivoting lever (5) are mounted coaxially with one another.

7. The emergency release device according to claim 6, wherein the spring (6), the primary pivoting lever (4) and the secondary pivoting lever (5) are supported by the transmission shifting shaft (2).

8. The emergency release device for manual actuation of a parking lock of a shift-by-wire gear-change transmission of claim 5, wherein a ball end (9) of the mechanical transfer device (7) engages with the primary pivoting lever (4), a support bracket (10) is fixed to the transmission housing (1) and supports the cable (7), and an elastomeric sealing bellows (11) encasing the cable (7) between the ball end (9) and the support bracket (10).

9. An emergency release device for manual actuation of a parking lock of a shift-by-wire gear-change transmission, the emergency release device comprising:

a cable (7) located between an emergency release actuator and the transmission, the cable (7) engages a pivoting lever mechanism (3) that is supported on an end of a transmission shifting shaft (2), the transmission shifting shaft (2) passes through a transmission housing (1) such that the end of the transmission shifting shaft (2) which supports the pivoting lever mechanism (3) is remote from the transmission;

an elastomeric sealing bellows (11) encasing the cable (7) between a ball end (9) of the cable (7), that engages with the pivoting lever mechanism (3), and a support bracket (10), that is mounted on the transmission housing (1);

the pivoting lever mechanism (3) comprising a primary pivoting lever (4) that is connected to the cable (7), a secondary pivoting lever (5) that is rotationally fixed to the end of the transmission shifting shaft (2) and a unidirectional coupling element (8), the primary pivoting lever (4) and secondary pivoting lever (5) being located outside of the transmissions;

a spring (6) which couples the primary lever (4) and a housing abutment (12), the housing abutment (12) being directly fixed to the transmission housing (1) the primary lever(4) being biased into abutment with the housing abutment (12) by force of the spring (6) the spring being supported axially between the primary lever (4) and the secondary pivoting lever (5); and when the primary pivoting lever (4) is actuated, the primary pivoting lever (4) and the secondary pivoting lever (5) are coupled together by the unidirectional coupling element (8) and when only the secondary pivoting lever (5) rotates via rotation of the transmission shifting shaft (2), and the primary pivoting lever (4) and the secondary pivoting lever (5) are decoupled from one another.

10. The emergency release device according to claim 9, wherein the unidirectional coupling element (8) is arranged on one of the primary pivoting lever (4) and the secondary pivoting lever (5).

11. The emergency release device according to claim 9, wherein the unidirectional coupling element (8) is an abutment.

12. The emergency release device according to claim 11, wherein the unidirectional coupling element (8) is a bent tab formed on one of the secondary pivoting lever (5) and the primary pivoting lever (4), and the unidirectional coupling element (8) pivotably contacts the other of the secondary pivoting lever (5) and the primary pivoting lever (4).

13. The emergency release device for manual actuation of a parking lock of a shift-by-wire gear-change transmission of claim 9, wherein the primary pivoting lever(4) is supported by the transmission shifting shaft (2) and is pivotable with respect to the transmission shifting shaft (2) about a rotational axis of the transmission shifting shaft (2), and the secondary pivoting lever (5) is rotationally fixed to the transmission shifting shaft (2) such that the secondary pivoting lever (5) pivots about the rotational axis of the transmission shifting shaft (2) as the transmission shifting shaft (2) rotates.

* * * * *